(12) United States Patent
Cantrill et al.

(10) Patent No.: US 6,394,089 B1
(45) Date of Patent: May 28, 2002

(54) PATIENT VENTILATOR OXYGEN CONCENTRATION SYSTEM

(75) Inventors: Dean Cantrill; Michael Zugmaier, both of Bettendorf, IA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/484,448

(22) Filed: Jan. 18, 2000

(51) Int. Cl.[7] ................................................ A62B 7/10
(52) U.S. Cl. ............................ 128/205.12; 128/204.18; 128/205.24
(58) Field of Search ..................... 128/200.24, 201.25, 128/201.28, 202.26, 204.18, 205.11, 205.12, 205.24

(56) References Cited

U.S. PATENT DOCUMENTS

| | | | |
|---|---|---|---|
| 5,591,399 A | * | 1/1997 | Goldman et al. .............. 422/44 |
| 5,766,310 A | * | 6/1998 | Cramer .......................... 95/96 |
| 5,975,081 A | * | 11/1999 | Hood et al. .................. 128/845 |
| 5,988,165 A | * | 11/1999 | Richey et al. .......... 128/205.12 |

\* cited by examiner

*Primary Examiner*—Glenn K. Dawson
(74) *Attorney, Agent, or Firm*—Lowe Hauptman Gilman & Berner, LLP

(57) ABSTRACT

The present invention called a patient ventilator oxygen concentration system advantageously utilizes an existing suitable air supply and provides a modular oxygen concentrator that uses the existing air supply and a medical grade air filtration package for providing medical grade using the existing air supply. The oxygen concentrator has multiple bed pairs which can be selectively activated. If one of the multiple bed pairs is not activated, the excess air provided by the existing air supply is filtered and medical grade air is supplied instead of oxygen gas for use with patient ventilators. Advantageously, the present invention obtains a large increase in medical grade air flow at the expense of very little oxygen flow while maintaining oxygen purity using the existing air supply. The present invention provides a pneumatic circuit which is capable due to a modular bed design. Each bed pair uses approximately three SCFM (80 SLPM) to produce five SLPM of oxygen. Shutting down a bed pair reduces the oxygen flow but increases the available compressed air to be converted into medial grade air. The remaining bed pair maintains their oxygen purity because the compressed air supply is not reduced.

23 Claims, 2 Drawing Sheets

PATIENT VENTILATOR OXYGEN CONCENTRATION SYSTEM

FIELD OF THE INVENTION

The present invention relates generally to oxygen concentration systems, and more particularly, to a patient ventilator oxygen concentration system using an existing source of compressed air allowing medical grade air to be simultaneously supplied along with oxygen gas from an oxygen concentrator.

BACKGROUND OF THE INVENTION

There are a wide variety of medical applications in which oxygen and medical grade air are required. Oxygen is used for a number of respiratory care treatments. Medical grade air (as defined by United States Pharmacopia (USP) XXI) also has a number of respiratory care treatment applications. In addition to the critical care and the therapeutic benefits of these two gases, oxygen and medical grade air are used to power a range of pneumatic driven medical devices.

Hospitals have a need for oxygen and medical grade air. In military hospitals and in Europe, these needs are usually met by using oxygen concentrators for patients requiring oxygen gas and a filtration system for providing medical grade air for respiratory care treatment such as ventilators. Most United States hospitals use high-pressure gas systems or liquid oxygen to gaseous oxygen conversion systems to provide medical grade oxygen.

Hospitals use sources of compressed air. Conventional pressure swing absorption systems require a source of compressed air. Most conventional pressure swing adsorption systems use a compressor as the source of compressed air. A need exists for a system and method which can use a portion of the compressed air supply for a pressure swing absorption system, yet simultaneously allows some of the compressed air supply to be used as medical grade air.

SUMMARY OF THE INVENTION

It is, therefore, an object of the present invention to provide a patient ventilator oxygen concentration system using an existing source of compressed air to provide oxygen gas and medical grade air.

Another object of the present invention is to provide a patient ventilator oxygen concentration system which simultaneously provides medical grade air from an air filtration system supplied along with oxygen gas from an oxygen concentration system.

Another object of the present invention is to power patient ventilators using medical grade air providing concentrated oxygen used by such ventilation devices while controlling the patient's partial pressure of oxygen in their blood stream with metered doses of oxygen.

Yet another object of the present invention is to produce both therapeutic oxygen and medical grade air flow quantities and at specific pressures compatible with patient ventilation devices.

It is another object of the present invention to provide a patient ventilator oxygen system which can maintain oxygen purity by using a modular bed design.

It is another object of the present invention to provide a patient ventilator oxygen system using multiple sets of zeolite beds.

The present invention called a patient ventilator oxygen concentration system advantageously utilizes an existing suitable air supply and provides a modular oxygen concentrator that uses the existing air supply and a medical grade air filtration package for providing medical grade using the existing air supply. The oxygen concentrator has multiple bed pairs which can be selectively activated. If one of the multiple bed pairs is not activated, the excess air provided by the existing air supply is filtered and medical grade air is supplied instead of oxygen gas for use with patient ventilators. Advantageously, the present invention obtains a large increase in medical grade air flow at the expense of very little oxygen flow while maintaining oxygen purity using the existing air supply. It is not possible to make this air/oxygen trade-off using a conventional pressure swing absorption (PSA) system for maintaining oxygen purity not having multiple bed pairs. The present invention provides an oxygen concentrator having a pneumatic circuit using a modular bed design. Each bed pair uses approximately three Standard Cubic Feet per Minute (SCFM) (80 SLPM) to produce five Standard Liters Per Minute (SLPM) of oxygen. Shutting down a bed pair reduces the oxygen flow but increases the available compressed air to be converted into medical grade air. The remaining bed pair maintain their oxygen purity because the compressed air supply is not reduced. By contrast, if a single bed pair system were used, reducing the oxygen output would not free up a significant amount of feed air to be converted into medical grade air. Using a conventional oxygen concentrator, if the demand for medical grade air increased beyond rated flow, the oxygen purity would decrease due to the transfer of feed air from the PSA bed pair to the medical grade air system.

These and other objects of the present invention are achieved by a patient ventilator oxygen concentration system including a compressor having an outlet, at least one switching valve connected to the outlet, an oxygen concentrating system including a plurality of n air valves each connected to said at least one switching valve, n sets of zeolite beds each having an inlet connected to a said corresponding air valve and plurality of n oxygen gas valves each connected to a corresponding zeolite bed and a medical grade ventilator air supply comprising an air filtering system connected to said at least one switching valve and a plurality of medical grade air valves each connected to the air filtering system.

The foregoing and other objects of the present invention are achieved by a patient ventilator oxygen concentration system including at least one switching valve connected to a source of compressed air. A plurality of n air valves are each connected to the at least one switching valve. An oxygen concentrating system includes n sets of zeolite beds each having an inlet connected to a corresponding air valve. A plurality of n oxygen gas valves are each connected to a corresponding zeolite bed valve. A medical grade ventilator air supply includes, an air filtering system connected to the at least one switching valve, and a plurality of medical grade air valves each connected to the air filtering system.

The foregoing and other objects of the present invention are achieved by a method of simultaneously providing oxygen gas and medical grade air using a source of compressed air providing a volume of compressed air and n sets of zeolite beds, including flowing a portion of the volume of compressed air through one or more of the sets of n zeolite beds and providing oxygen gas to up to x of n oxygen outlets and flowing the remainder of the volume of the compressed air into a filtering system and then to n-x air outlets.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figure of the accompanying drawing, wherein elements having the same reference numeral designations represent like elements throughout and wherein.

Best Mode for Carrying Out the Invention

Figure 1:
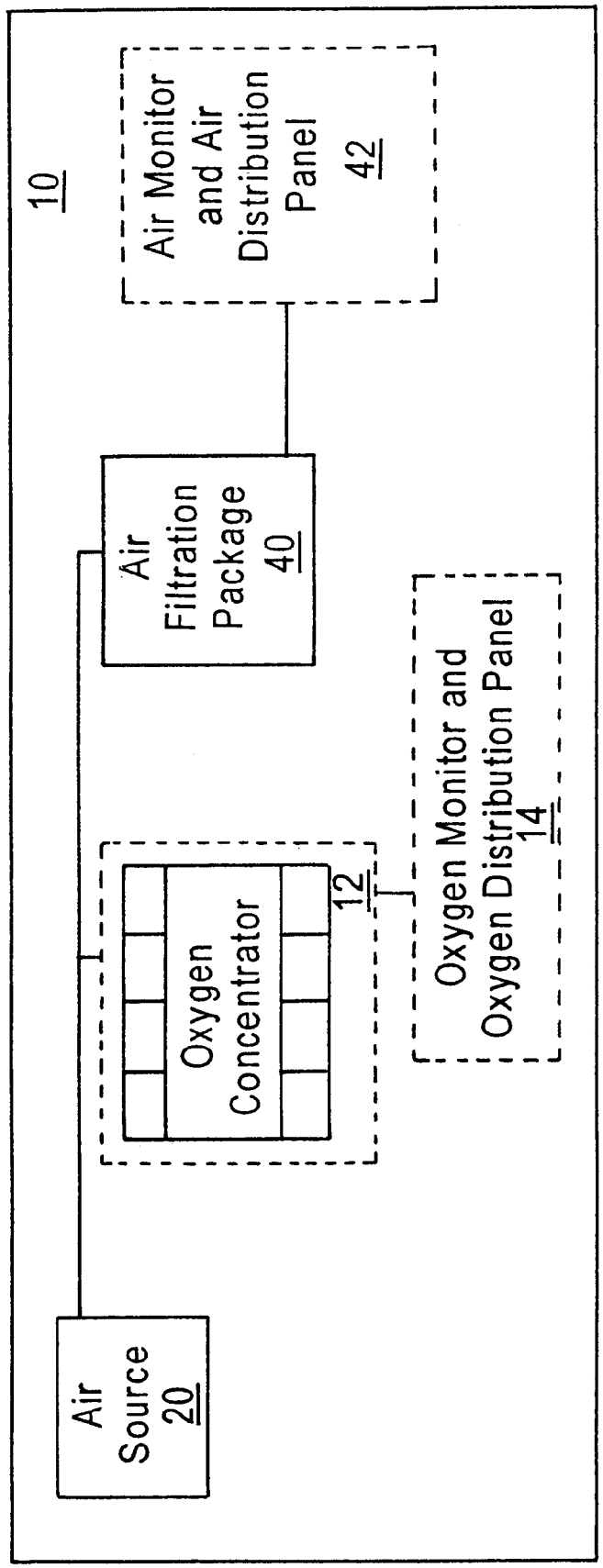
FIG. 1 is a pneumatic circuit according to the present invention.

The present invention called a Patient Ventilator Oxygen Concentration System (PVOCS) 10 includes three major components illustrated in FIG. 1. The system 10 includes an oxygen concentrator 12, an air source 20, and a medical air filtration package 40. An oxygen monitor and oxygen distribution panel 14 is used to control the oxygen concentrator. An air monitor and air distribution panel 42 is used to control the air filtration package 40 as described in detail below.

The air source 20 provides compressed air at specific flow and pressure values designed to support the air filtration package 40 and the oxygen concentrator 12. The air filtration package 40 processes the air per the requirements for medical grade air delivering a set volume. The oxygen concentrator 12 uses the remainder of the supply air from the air source concentrating oxygen using the known Pressure Swing Adsorption process (PSA). An exemplary PSA system is disclosed in U.S. Pat. No. 5,766,310 issued Jun. 16, 1998, assigned to the instant assignee, which is hereby incorporated by reference into this specification in its entirety.

The primary operation of the PVOCS 10 is to provide 20 SLPM of medical grade air at 50 PSIG while simultaneously providing 20 SLPM of oxygen at 50 PSIG. In addition to the 20/20 product gas flow, customers require the ability to support higher flows of medical grade air to meet peak patient ventilation demands. The PVOCS 10 incorporates a pneumatic circuit allowing the user to reduce oxygen flow incrementally. Consequently, this allows an increased flow of medical grade air while preventing a drop in oxygen concentration that normally occurs in a situation known as "overdraw."

The air source 20 is used to both concentrate oxygen using the oxygen concentrator 12 and provide medical grade air using the air filtration package 40. The efficiency of the oxygen concentrator 12 is approximately 17:1 (16.8 parts air to 1 part oxygen). By reducing the oxygen output in 5 SLPM increments, the PVOCS 10 can increase the medical grade air output by 80 SLPM per each incremental reduction in oxygen output. The pneumatic circuit 10 advantageously maintains the practical economy and efficiency of the air source 20, preventing an increase in required air source 20 output, and allowing maintenance of stable oxygen concentration.

Figure 2:
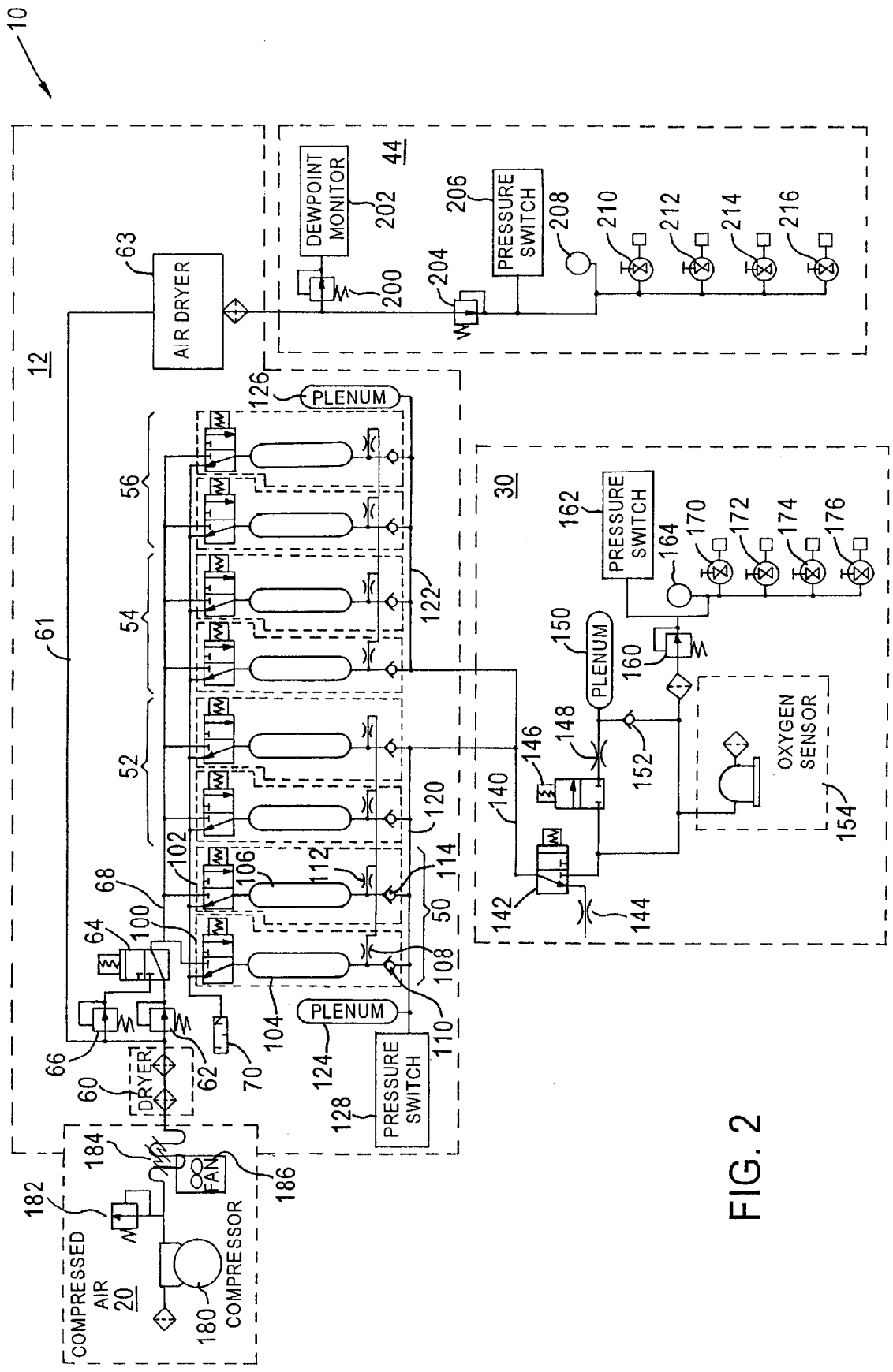
FIG. 2 is a more detailed pneumatic circuit of FIG. 1.

Refer now to FIG. 2 where the pneumatic circuit for the PVOCS 10 is illustrated in greater detail according to the present invention. The pneumatic circuit 10 includes the modular bed system 12, the source of compressed air 20, an oxygen gas circuit 30 that is part of the oxygen monitor and distribution panel 14, and a medical grade air circuit 44 which is part of the air monitor and air distribution panel 42. The source of compressed air 20 is preferably an existing air supply such as a compressor used in a hospital. Alternatively, a compressor capable of providing at least 320 SLPM of compressed air at 50 psi can be utilized. The compressed air supplied by compressed air source 20 is provided to the modular bed system 12 and the medical grade air circuit 44. All of the compressed air 20 can be provided to the medical grade air circuit 44 or a portion of the compressed air can be provided to the modular bed system 12 to be converted into oxygen gas which is then provided by the oxygen gas circuit 30 to patients in the hospital.

The PVOCS 10 has four settings which are set using the oxygen monitor and distribution panel 14 and the air monitor and air distribution panel 42 as shown in the table below.

| Setting | Oxygen flow rate | Medical grade air flow rate |
|---------|------------------|------------------------------|
| 1 | 20 slpm | 20 slpm |
| 2 | 15 slpm | 100 slpm |
| 3 | 10 slpm | 180 slpm |
| 4 | 5 slpm | 260 slpm |

The depicted oxygen concentrator is a modular bed system and includes four sets of zeolite bed pairs, a first bed pair 50, a second bed pair 52, a third bed pair 54 and a fourth bed pair 56, although any number of bed pairs can be used. Positioned between an outlet of the source of compressed air 20 is a dryer 60. The compressed air 20 exiting from the dryer 60 enters a pressure regulator 62 which in turn is coupled to a two-way switching valve 64. Switching valve 64 can provide compressed air to the pairs of molecular sieve beds 50, 52, 54, 56 and/or to a pressure regulator 66 which in turn provides the compressed air to the medical grade air circuit 44. The regulator 66 is coupled to an air dryer 63. The air dryer is depicted as part of the oxygen concentrator but can also be part of the medical grade air circuit 44.

The two-way switching valve 64 can provide compressed air to molecular sieve beds via line 68. For purposes of explanation only, the molecular sieve bed pair 50 will be described although bed pairs 52, 54, 56 are identical to bed pair 50. Bed pair 50 includes a pair of two-way switching valves 100, 102 and a pair of zeolite beds 104, 106. Bed 104 is coupled to a valve 100. Bed 106 is coupled to valve 102. Bed 104 exhausts into an orifice 108 and a check valve 110. Similarly, bed 106 exhausts into an orifice 112 and a check valve 114. Check valves 108 and 114 are connected to a product output line 120 which is also coupled to a reservoir or plenum 124. A pressure switch 128 controls the pressure of the exhaust gas exhausting from bed pairs 50, 52. Similarly, beds 54 and 56 are connected on their output side to product output line 122 and plenum 126. Product output lines 120 and 122 are connected to a common product output line 140 which is connected to a two-way valve 142. The exhaust portion of valve 142 is connected to an orifice 144. The other side of valve 142 is connected to a two-way valve 146 and also to an oxygen sensor or oxygen switch 154. Valve 46 is connected to an orifice 148 which is connected to a plenum 150 and a check valve 152. Oxygen sensor 154 and check valve 152 are commonly connected to a pressure regulator 160. Pressure regulator 160 has its output side connected to a pressure switch 162 and a pressure gauge 164. The pressure regulator 160 is coupled to four oxygen outlets 170, 172, 174, 176.

An exemplary source of compressed air 20 is depicted in FIG. 2 and includes a compressor 180 connected to a relief valve 182 which the output of the compressor is fed to a heat exchanger 184 which is cooled by a fan 186. Any other source of compressed air can be used in the invention.

The output of air dryer 63 is provided to the medical grade air circuit 40. The air dryer 63 is connected to a pressure regulator 200 which is connected to a dewpoint monitor 202. A second pressure regulator 204 provides medical grade compressed air to a pressure switch 206, a pressure gauge 208 and four air valves 210, 212, 214, 216.

In operation, the oxygen outlets 170, 172, 174, 176 and air outlets 210, 212, 214, 216 can be turned on in any combination to achieve the flows shown in the table above. Any or all of the bed pairs 50, 52, 54, 56 can be activated or turned off depending on oxygen demand. It should now be apparent that a patient ventilator oxygen concentrator system has been described in which air from a compressed air source can be used to supply a plurality of sieve bed pairs and a medical grade air circuit.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A patient ventilator oxygen concentration system, comprising:
    a compressor having an outlet;
    at least one switching valve connected to said outlet;
    an oxygen concentrating system comprising:
        a first plurality of n air valves each connected to said at least one switching valve;
        n sets of zeolite beds each having an inlet connected to a said corresponding air valve; and
        a plurality n oxygen gas valves each connected to a said corresponding zeolite bed;
    a medical grade ventilator air supply comprising:
        an air filtering system connected to said at least one switching valve; and
        a second plurality of medical grade air valves each connected to said air filtering system.

2. The system of claim 1, wherein a combination of n of said first plurality of air valves and n said oxygen gas valves are in said open position.

3. The system of claim 1, further comprising a filter positioned between said compressor and said inlets of said zeolite beds.

4. The system of claim 1, further comprising a first line between said compressor and said inlets of said zeolite beds and a second line between said compressor and said plurality of n air valves.

5. The system claim 4, further comprising an air dryer in said second line.

6. The system of claim 1, further comprising a first outlet line connected to half of said n zeolite beds and a second outlet line connected to the other half of said n zeolite beds, said first outlet line and said second outlet line both connected to each of said oxygen valves.

7. The system of claim 6, further comprising a first plenum and a second plenum each connected to said first outlet line and said second outlet line, respectively.

8. The system of claim 1, wherein when n oxygen gas valves are in the open position 5 SLPM of oxygen flows through each of said oxygen gas valves and 20 SLPM of medical grade air is available to said plurality of medical grade air valves.

9. The system of claim 1, wherein n=4 and wherein n oxygen gas valves are in the open position.

10. The system of claim 1, wherein said compressor is a scroll compressor.

11. A patient ventilator oxygen concentration system, comprising:
    at least one switching valve connected to a source of compressed air;
    a first plurality of n air valves each connected to said at least one switching valve;
    an oxygen concentrating system comprising:
        n sets of zeolite beds each having an inlet connected to one of said first plurality of corresponding air valves;
        a plurality of n oxygen gas valves each connected to a said one of said n sets of corresponding zeolite bed valve, and
    a medical grade ventilator air supply comprising:
        an air filtering system connected to said at least one switching valve; and
        a second plurality of medical grade air valves each connected to said air filtering system.

12. The system of claim 11, further comprising a compressor.

13. The system of claim 12, wherein said compressor is a scroll compressor.

14. The system of claim 11, wherein a combination of n of said first plurality of air valves and n of said plurality of oxygen gas valves are in an open position.

15. The system of claim 11, further comprising a filter positioned between said compressor and said inlets of said zeolite beds.

16. The system of claim 11, further comprising a first line between a compressor and said inlets of said zeolite beds and a second line between said compressor and said first plurality of air valves.

17. The system of claim 16, further comprising an air dryer in said second line.

18. The system of claim 11, further comprising a first outlet line connected to half of said n zeolite beds and a second outlet line connected to the other half of said n zeolite beds, said first outlet line and a second outlet both connected to each of said oxygen gas valves.

19. The system of claim 18, further comprising a first plenum and a second plenum each connected to said first outlet line and said second outlet line, respectively.

20. The system of claim 11, wherein when n oxygen gas valves are in the open position 5 SLPM of oxygen flows through each of said oxygen gas valves and 20 SLPM of medical grade air is available to said plurality of medical grade air valves.

21. The system of claim 11, wherein n=4 and wherein n oxygen gas valves are in the open position.

22. A method of simultaneously providing oxygen gas and medical grade air using a source of compressed air providing a volume of compressed air and n sets of zeolite beds, comprising:
    flowing a portion of the volume of compressed air through one or more of the n sets of zeolite beds and providing oxygen gas to up to x of n oxygen outlets;
    flowing the remainder of the volume of the compressed air into a filter system and then to n-x air outlets.

23. The method of claim 22, comprising using a compressor for providing the source of compressed air.

* * * * *

UNITED STATES PATENT AND TRADEMARK OFFICE
CERTIFICATE OF CORRECTION

PATENT NO. : 6,394,089 B1
DATED : May 28, 2002
INVENTOR(S) : Dean Cantrill and Michael Zugmaier It is certified that error appears in the above-identified patent and that said Letters Patent is hereby corrected as shown below:

<u>Title page</u>,
Item [73], Assignee, please replace "Northrop Grumman Corporation, Los Angeles CA (US)" with -- Litton Systems Inc., Woodland Hills, California, (US) --

Signed and Sealed this

Fourth Day of November, 2003

JAMES E. ROGAN
*Director of the United States Patent and Trademark Office*